Sept. 25, 1962   A. KLAAR ET AL   3,055,324
ZIGZAG SEWING MACHINE WITH AUTOMATIC MOTIF-FREQUENCY CONTROL
Filed June 13, 1957   11 Sheets-Sheet 1

Inventors
Albert Klaar
and
Otto Wank

United States Patent Office 3,055,324
Patented Sept. 25, 1962

3,055,324
ZIGZAG SEWING MACHINE WITH AUTOMATIC MOTIF-FREQUENCY CONTROL
Albert Klaar and Otto Wank, Bielefeld, Germany, assignors, by mesne assignments, to Anker-Phoenix Nähmaschinen A.G., Bielefeld, Germany, a corporation of Germany
Filed June 13, 1957, Ser. No. 665,555
Claims priority, application Germany June 18, 1956
17 Claims. (Cl. 112—158)

Our invention relates to an improvement in zigzag sewing machines, particularly with respect to the device for controlling the motif frequency.

According to the copending application of Heinrich Theenhauser and Otto Wank, Serial No. 515,160, filed June 13, 1955, now Patent No. 2,966,868, granted January 3, 1961, the motif frequency for the repetitive unit pattern of an embroidery is controlled by means of a manual setting member. This permits the varying of the motif of an embroidery pattern in such manner that small or large motifs can be produced, all having the same stitch density but having respectively different numbers of stitches per motif. For this purpose, the rotating speed of the cam disc or discs employed to control the stitching width or the stitching area, or both, is controlled during the sewing operation by displacing this manual setting member. When the motif of an embroidery pattern is to be varied, the person sewing must therefore continually change the position of the motif-frequency setting member while the sewing operation is in progress.

It is an object of the invention to eliminate the need for manual operation and for continuous attention when varying the motif frequency during a sewing operation.

According to the invention, therefore, we provide the motif-frequency control device with means which varies the motif frequency automatically, under control of a member which is preferably a control cam.

The foregoing object and feature as well as further details of the invention will be apparent from the embodiment illustrated in the drawings and described hereinafter. In the drawings.

The illustrated machine is suitable for straight sewing as well as for decorative stitching such as applique, darning, or embroidery work. The basic mechanisms for producing straight and zigzag stitches, feeding the material, and forming loop stitches are related to known sewing machines. The controls for varying the width and location of the zigzag stitches are related to those disclosed in German Patent 904,020 of 1954.

Figure 2:
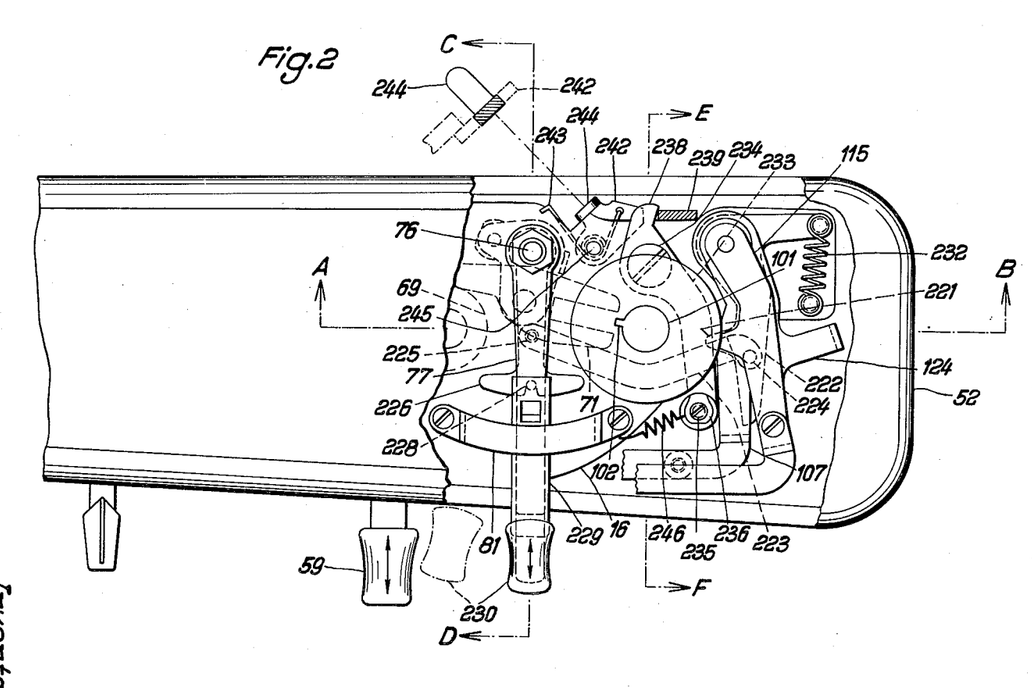
FIG. 2 is a top view of the same sewing machine portion, part of the machine cover being cut away to expose the components of the motif-frequency control device.
Figure 3:
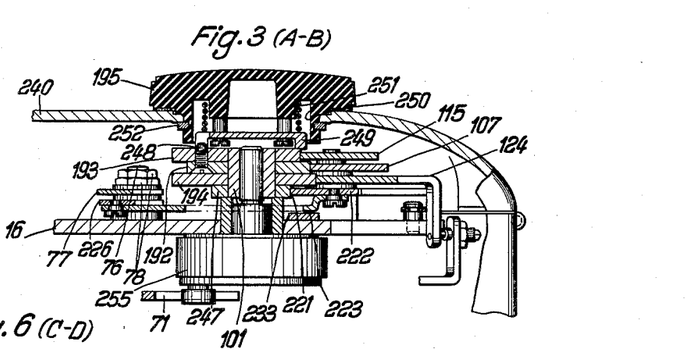
FIG. 3 is a vertical section through the machine along a line in the position A—B indicated in FIG. 2; the top is not cut away in FIG. 3.

As described in said copending application Serial No. 515,160, the automatic control of the stitching area and of the stitching width is effected by means of a cam disc, whereas the automatic regulation of the stitching area, the stitching width and the stitching length, in the present case, is effected by several cam discs 103, 104, 105 (FIG. 5) which cooperate with feeler levers 107, 115, 124 (FIGS. 2, 3).

The novel motif-frequency control mechanism, to which this application is primarily directed, will be described first.

Figure 5:
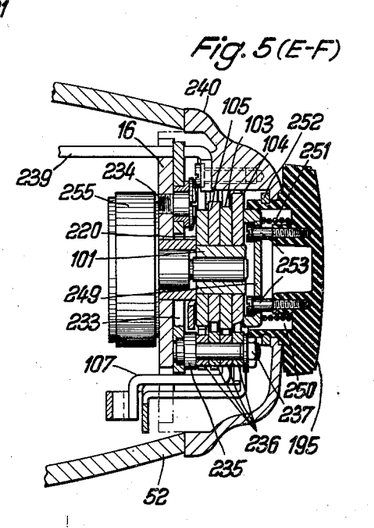
FIG. 5 is a section along a line such as E—F of FIG. 2, but is turned 90 degrees for convenience of illustration. The cams of FIG. 5 are not the same as those of FIG. 3.
Figure 6:
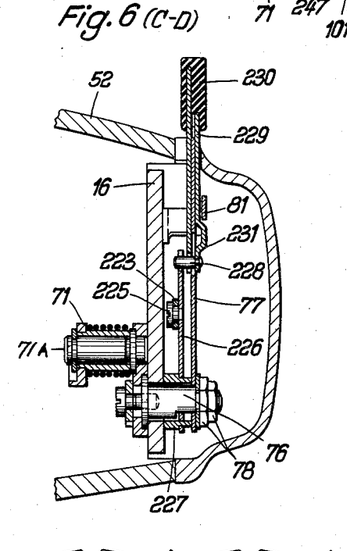
FIG. 6 is a vertical section along the line C—D of FIG. 2 turned 90 degrees.
Figure 7:
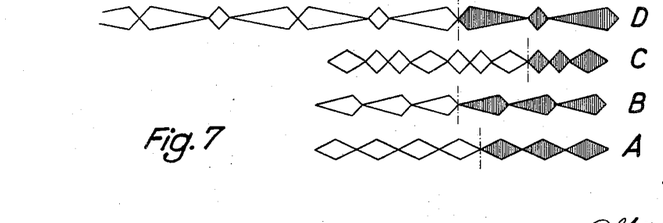
FIG. 7 illustrates examples of four embroidery patterns differing from each other only by a change in motif frequency as automatically obtained by means of the device according to the invention.
Figure 9:
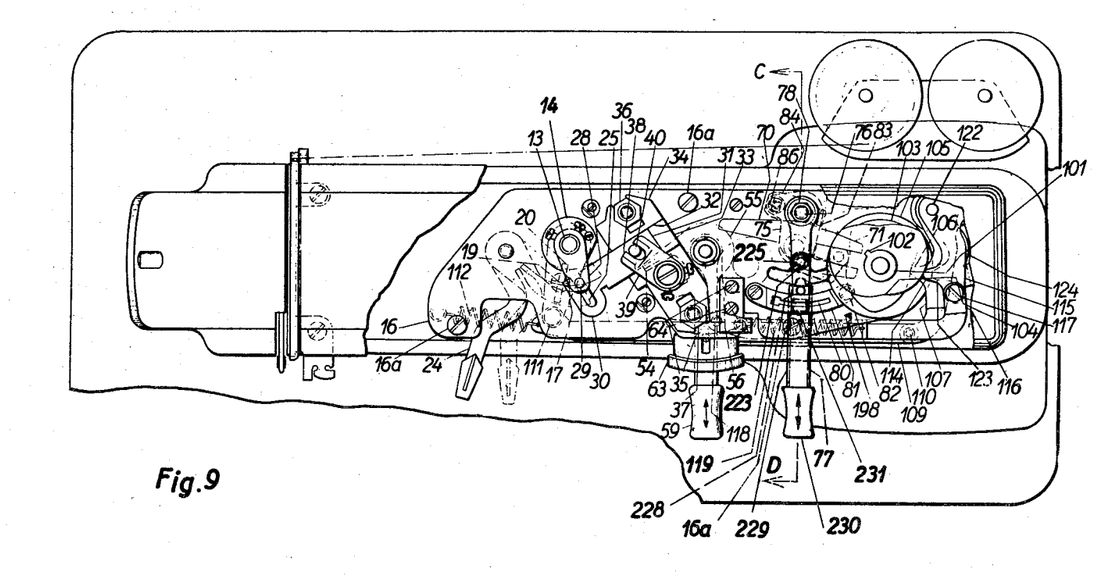
FIG. 9 is a second plan view of the components accommodated in the sewing machine housing, being more comprehensive than FIG. 2.

The control of the motif frequency is dependent upon the position of the arm or handle 77 (FIG. 2) which is continuously displaceable and has the effect of shaping the motif of an embroidery pattern during a sewing operation. In order to control the motif frequency automatically, another cam disc 220 (FIG. 5) is provided which is connected to sleeve 101 by a keyway member 102 (FIG. 2). The cam disc 220 (FIG. 5) cooperates with the nose 221 (FIGS. 2 and 3) of a feeler lever 222 which is biased by the pulling force of a spring 232 (FIG. 2) and to which a linking rod 223 is pivotally connected at 224. The other end of the linking rod 223 is connected at 225 with a lever 226. A sleeve 227 (FIG. 6) is riveted into the lever 226 and is journalled on a shaft 76. The front end of the lever 226 is fork-shaped. A pin 228 cooperates with the fork, the pin being riveted into a slider portion 229. The slider 229 carries a handle 230 and is displaceably mounted on the arm 77. The slider 229 is further provided with a resilient nose or hump 231 which serves as a detent in cooperation with a slide bridge 81. Bridge 81 is secured on the carrier plate 16 by means of screws 82 (FIG. 9). The arm 77 is mounted on the pin 76 and is secured thereto by means of nuts 78 (FIG. 6). Bridge 81 provides self-braking action when slider 229 is pulled out. This draws spring hump 231 underneath the bridge.

Figure 18:
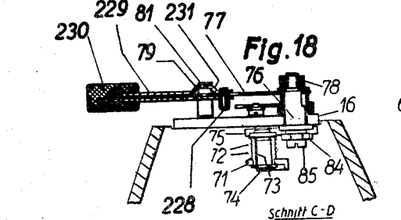
FIG. 18 is a section along the line C—D in FIG. 9; it illustrates the motif-frequency control arm.

Arm 77 is manually movable by means of handle 230 regardless of whether the slider 229 is pushed in or pulled out. Automatic operation of arm 77 takes place when pin 228 on slider 229 operatively connects lever 226 to arm 77, by pushing the slider in. Arm 77 then turns pivot 76 which turns lever arm 75 (FIG. 18). Arm 75 carries pin 74 on which fork arm 71 is pivoted. If handle 230 is pushed to the extreme left, to the switching-off position, shown in dotted lines in FIG. 2, the pivot pin 74 is also shifted to the extreme left position. This causes complete disengagement of fork 71 from rotating drive cam 69. As described below, this disengagement can also be brought about by action of a special cam 247, acting through the cam follower lever 222 and link 223. Special cam 247 is employed when buttonholes are to be made.

Figure 22:
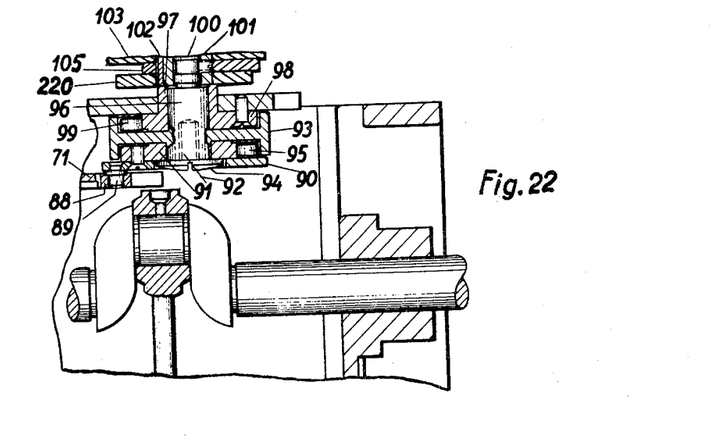
FIG. 22 is a section of the roller coupling clutch.
Figure 23:
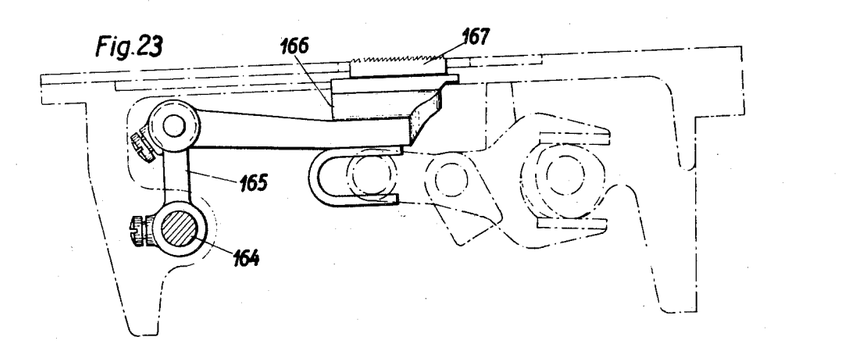
FIG. 23 is a side view of the material pusher.

The drive of the cam discs 103, 104, 105, 220 is effected through a roller coupling 255 which forms an overrun clutch and is driven by means of an eccentric cam 69 (FIGS. 2, 22, and 25) and a fork arm 71. This drive mechanism is described in greater detail in the above-mentioned copending application Serial No. 515,160, and is further described below.

The handle 77 and cam disc 220 control the motif frequency by changing the pivot point of the fork lever 71. This displacement changes the effective leverage ratio of the fork lever 71, resulting in a correspondingly different number of stitches. When the cam disc 69 (FIG. 2) is driven, the fork lever swings and, acting through star roller coupling assembly 255, causes a partial rotary movement of the cam discs 103, 104, 105 and 220 (FIG. 5). By this means smaller or larger embroidery motifs can be produced with the same stitch density but with different motif frequency. Stitch density is controlled by varying the material feed.

Figure 1:
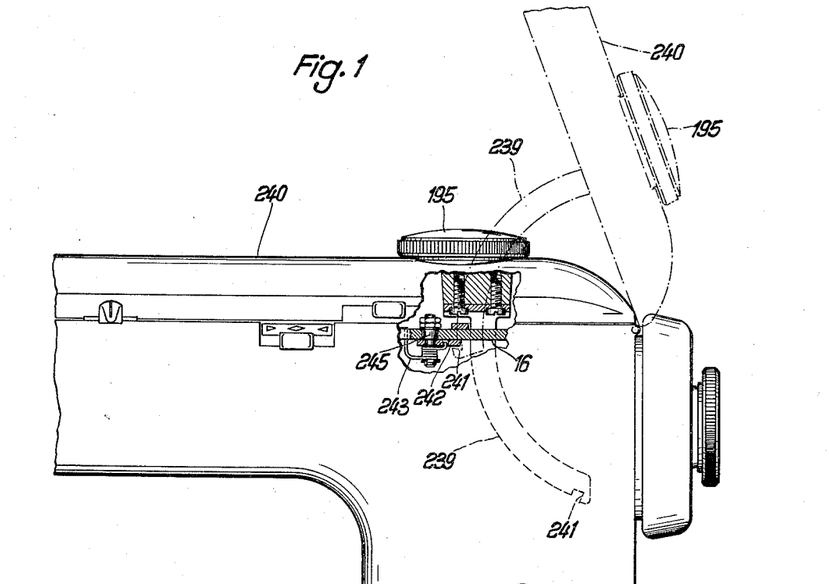
FIG. 1 is a front view of the sewing machine housing as seen from the position of the operator.
Figure 16:
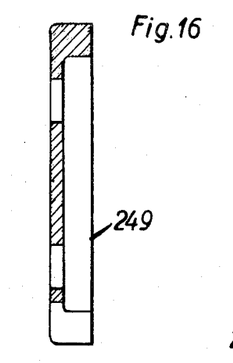
FIGS. 16 and 17 illustrate a plate forming part of the automatic cam control mechanism.
Figure 17:
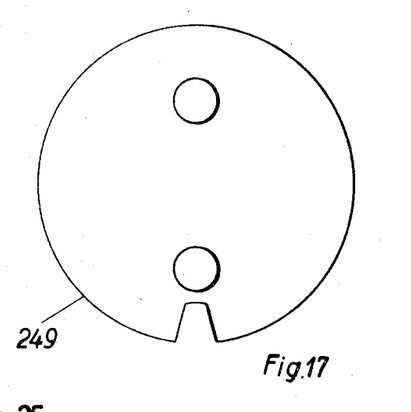

The cam follower or feeler levers 107, 115, 124, 222 must be moved into inactive position to permit the changing of cam discs 103, 104, 105 and 220. For this purpose an arm 233 (FIG. 2), subject to the pulling force of a spring 246 (FIG. 2), is provided. The arm is pivotally mounted at 234, about a stationary pivot pin. Riveted into the arm 233 is a pin 235 which carries a separate eccentric cam 236 (FIGS. 2 and 5) for each of the respective feeler levers. The eccentric cams 236 can be displaced or adjusted to compensate for manufacturing tolerances. After the eccentrics 236 are properly adjusted, they are pressed together by means of a nut 237 (FIG. 5). The arm 233 is further provided with an extension 238 (FIG. 2) positioned to be acted upon by a segment 239 which is mounted on the cover 240 (FIG. 1) for the top of the machine housing. Upon moving the cover 240 to open it, the segment 239 moves with it and is effective to swing the arm 233 counter-clockwise about pivot 234. This places the feeler levers 107, 115, 124 and 222 out of engagement with the respective cam discs 103, 104, 105, 220. In the open position, the cover 240 is arrested by means of a groove 241 in segment 239, a latch pawl 242 biased by a spring 243 catching in said groove. The pawl 242 is pivoted on the carrier plate 16 by means of a pivot pin 245. The latch pawl is provided with a handle 244 (FIG. 2) by means of which it may be released. Connected with the cover 240 is a knob 195 (FIGS. 1, 3, 5), the connection being by means of a lock ring 252 (FIG. 3). The knob 195 has a recess in which a spring 251 is inserted. The spring presses upon a plate 249 (FIGS. 16 and 17) having a cut-out providing a fork in effect. The plate 249 is guided in knob 195 by means of two screw-bolts 253 (FIG. 5). The disc 249 operates as a pressure member for the stack of cams 103, 104, 105, 220 in the closed condition of the cover 240.

It has been mentioned that for certain sewing patterns the cam discs must be exchanged for other discs. For instance, in order to produce a buttonhole in shirts, cotton sheets, lingerie and other washable goods, a special set of cam discs is provided which comprises four individual cam discs 192, 193, 194 and 247 (FIG. 3). Cam disc 192 serves for controlling the stitching width. Cam disc 193 serves for controlling the stitching area. Cam disc 194 controls the feed. The cam disc 247, however, acts only through its feeler lever 222 and the link 223 to shift the arm 77 into its outermost left-hand position according to FIG. 2, which constitutes the switching-off position for the cam-disc drive. The position of handle 230 shown in dot-and-dash lines (FIG. 2) is the switch-off position.

Figure 4:
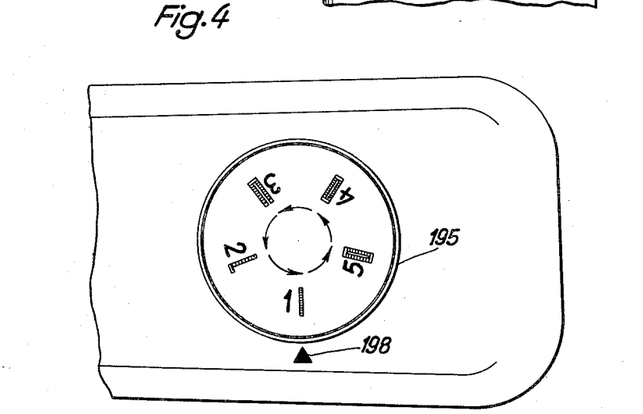
FIG. 4 is a top detail view of the same machine.

The cam discs 192, 193, 194, 247, which form a stack, are provided with an entrainer pin 248 (FIG. 3) which can enter into the above-described fork-shaped recess of the counter-pressure disc 249. In the closed position of the cover 240, the fork-shaped recess cooperates with, and registers with, the entrainer pin 248. For this purpose it is necessary to turn the knob 195 counter-clockwise until the entrainer pin discernibly catches into the fork-shaped recess of disc 249. This can be felt or heard when turning the knob. The knob 195 carries a number of symbols (FIG. 4) which represent the individual sewing operations for producing the buttonhole. The symbol "1" designates the first caterpillar, symbol "2" designates the first crossbar, symbol "3" the second caterpillar, symbol "4" the second crossbar, and symbol "5" denotes the sewing over of the buttonhole. Due to the fact that the above-mentioned roller coupling, that is, the over-run clutch, can be turned in only one direction, the stages represented by symbols 1 to 5 are forced to take place in the proper sequence during the progressing sewing operation. In order to make certain that the person sewing can always begin with the symbol "1," a mark 198 (FIG. 4) is provided on the surface of the cover 240. To permit the accurate fixing of the adjusting head 195 in the particular selected position, the cam disc 194 for controlling the feed is so designed that the appertaining feeler lever 124 operates as an arresting lever aside from its main function to operate as a control means for the feed. This can be done by providing five circumferentially spaced indented areas in the cam surface. For further details of this feature see the application of Otto Wank and Heinrich Theenhauser, Serial No. 660,878, filed May 22, 1957.

The motifs B, C, D are respective variations of the motif A and are produced by using in each particular case a different cam for motif-frequency control.

A more detailed description of the main elements of the sewing machine will now be given, with particular reference to FIGS. 8 to 26.

Figure 8:
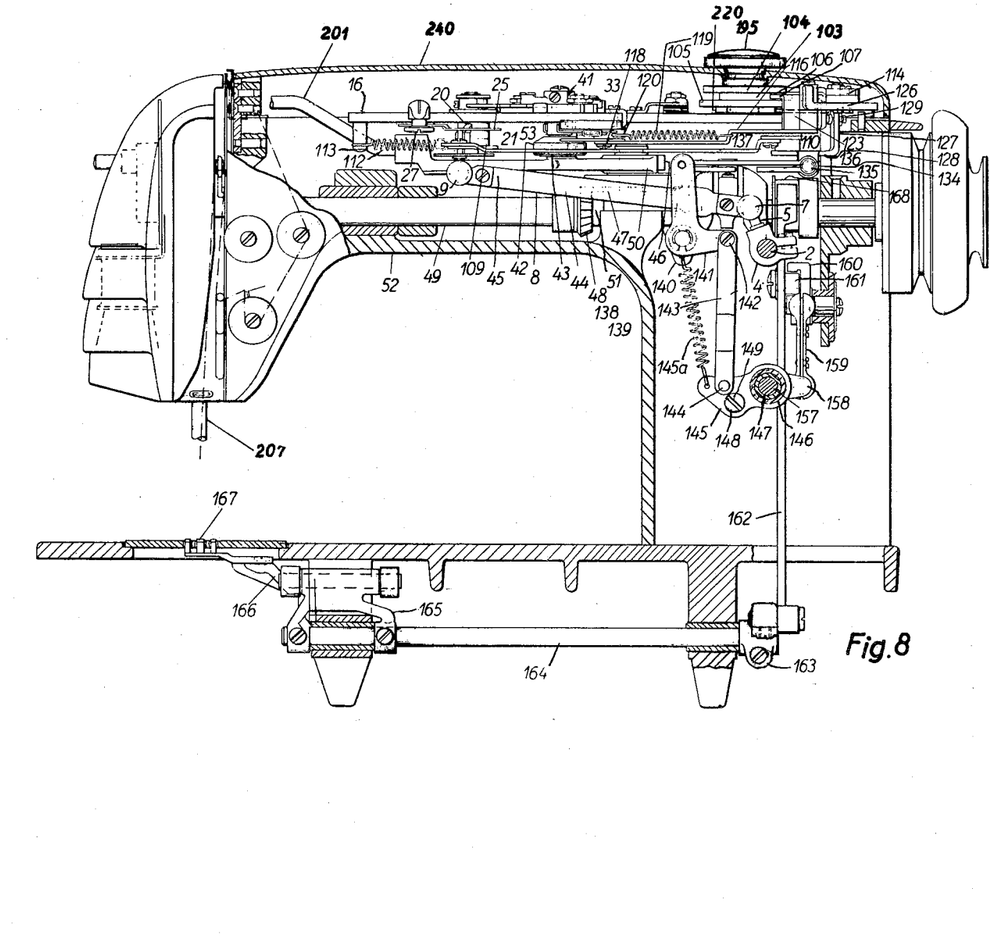
FIG. 8 is a side view, in partial section, illustrating the components of the device accommodated within the sewing machine housing.
Figure 10:
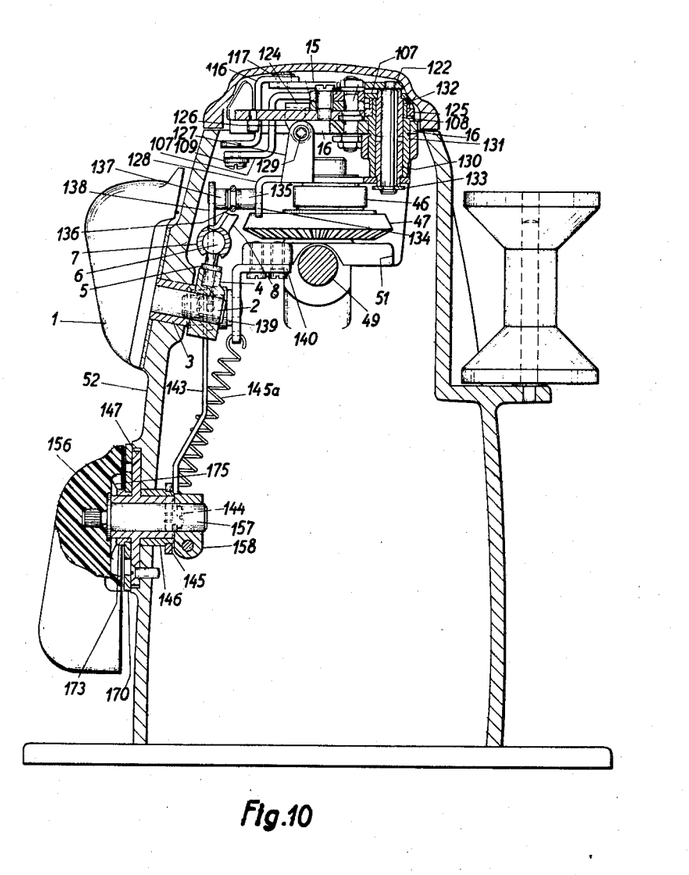
FIG. 10 is a vertical view, partly in section, of components of the stitching width control and the material feeding control.

The setting or control member 1 (FIG. 10) serves to control the stitching width. Fastened to the setting member 1 according to FIG. 10 is a pin 2 journalled in a sleeve or bushing 3. The pivot pin 2 is provided with a crank 4 into which is threaded a screw 5 carrying a ball-head 6. The head 7 of a link 8 cooperates with the ball 6. The other head 9 (FIG. 20) of link 8 cooperates with the ball 10 of a shoulder pin 11. The shoulder pin 11 is riveted into a lever 12 whose pivot shaft 13 is journalled in a sleeve 14. Sleeve 14 is secured by screws to a carrier plate 16. Journalled on the sleeve 14 is another sleeve 15 which is rigidly connected with a lever 17. Riveted into the lever 17 is a shoulder pin 18 which has a slot 19 (FIG. 9) receiving a pawl 20 (see also FIG. 8) which is pivotally mounted at 21. Each of the levers 12 and 17 has a recess 22 or 23 which can cooperate with the pawl 20 as will be explained in a later place. The pawl 20 is controlled by a lever 24 for coupling of the control means for the stitching width. The arm 25 of lever 24 can act upon the extension 26 or upon the slanting front portion of the pawl 20. The lever 24 serves to put the stitching width control into and out of operation manually or automatically, and is pivotally mounted on the carrier plate 16 by means of a shoulder screw 27 (FIG. 8). The carrier plate 16 is connected with the housing 52 by means of screws 16a (FIG. 9).

Firmly secured to shaft 13 by screws is an arm 28 (FIG. 9) which has a crank pin 29 straddled by a fork 30. The fork 30 is designed as a slider 31 which is displaceably guided in a slideway 32 formed by another slider 33. The slider 33 is displaceably mounted on the carrier plate 16 and has two forks 34, 35 that cooperate with respective guide blocks, not shown. The guide blocks are carried by respective screws or pivot pins on which they are secured by means of nuts 36, 37. The fork 38 of a fork lever 39 cooperates with a pin 40 mounted on the slider 31. The fork lever 39 is firmly joined with a pivot pin 41 (FIG. 8) of a block 42. The block 42 is journalled in the slider 33. A block 43 is guided in the block 42 and is pivoted on a pin 44 (FIGS. 8 and 24) which is rigidly connected with the side-stitch control fork 45 (FIG. 24) still to be described. The fork of the side-stitch control fork 45 straddles the eccentric 46 of a bevel gear 47 (FIGS. 8, 10) meshing with another bevel gear 48. The bevel gear 48 is fastened on the arm shaft 49. The bevel gear 47 is rotatably journalled on the pin 50 of a bearing block. The bearing block 51 is rigidly connected with the housing 52.

Figure 21:
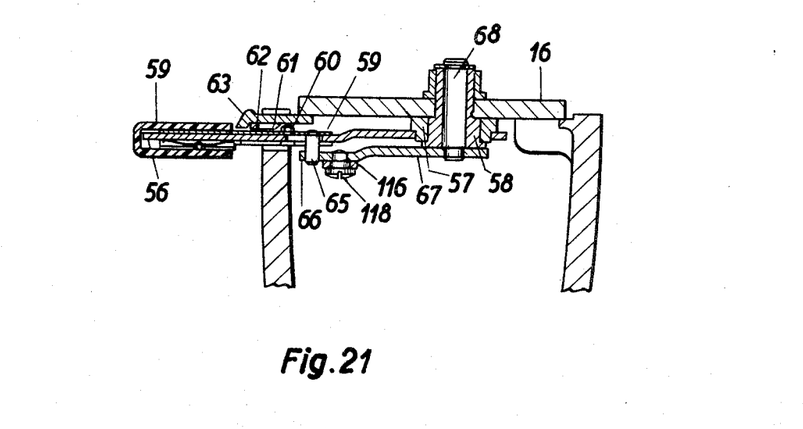
FIG. 21 illustrates the coupling device for the control of the stitching area.

The slider 33 is provided with a pin 53 (FIG. 8) cooperating with a fork 54 formed by an angular lever 55 shown in dotted outline in FIG. 9. The angular lever 55 carries an arm 56 which forms the manual control member for the control of the stitching area. The angular lever 55 is firmly connected with a bushing (sleeve) 57 (FIG. 21) which is rotatably journalled on another sleeve 58. The sleeve 58 is firmly connected with the carrier plate 16. A slider 59 is displaceably mounted on the arm 56 and carries a nose 60 which can cooperate with the recess 61 of an arresting or stop plate 62. The arresting plate 62 is screwed or fastened to a stop 63. The stop plate 63 is fastened to the carrier plate 16 by means of two screws 64 (FIG. 9). The slider 59 is provided with a coupling pin 65 which can cooperate with a recess 66 of a lever 67 (FIG. 21). The lever 67 is rigidly connected with a shaft 68 rotatably journalled in the sleeve 58. By displacing the slider 59, the nose 60 can be placed into connection, or contact, with the arresting plate 62 in one position of the slider, whereas in the other position the pin 65 can be coupled with the lever 67.

Figure 19:
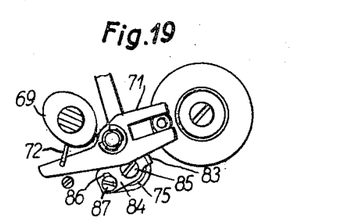
FIG. 19 shows the drive of the roller coupling clutch viewed from below.
Figure 20:
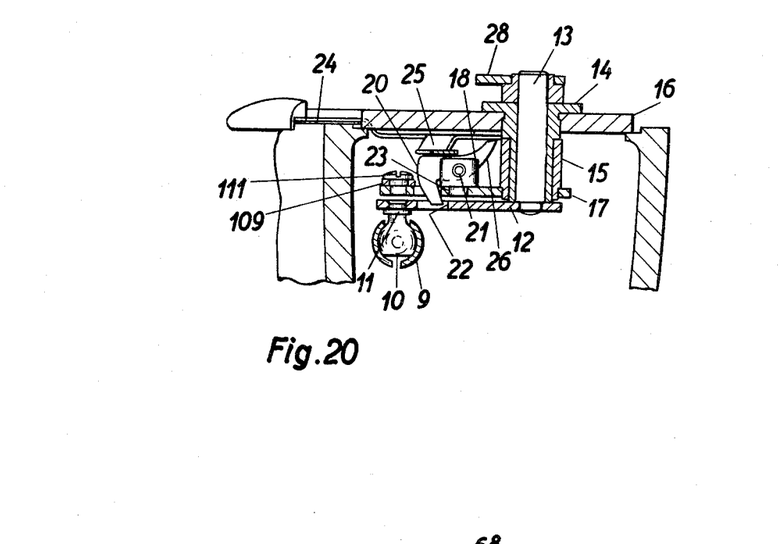
FIG. 20 illustrates the coupling device for the control of the stitching width.
Figure 25:
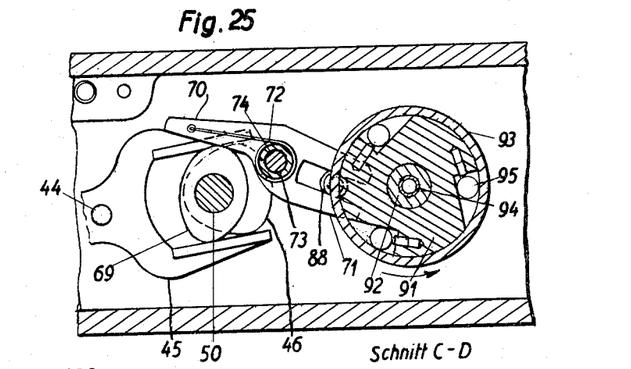
FIG. 25 illustrates the stepless drive of the roller coupling.

Firmly connected with the bevel gear 47 is an eccentric 69 (FIG. 25) for cooperation with an arm 70 of a forked arm 71. The fork arm 71 is rotationally biased by a spring 72 (FIGS. 18, 19). The fork arm 71 carries a sleeve 73 which is rotatably journalled on the pin 74 described above. Pin 74 is riveted into the arm 75 which carries the pivot pin 76. Pin 76 is journalled in the carrier plate 16. The arm 77 is secured to the pin 76 by nuts 78. As stated above, the arm 77 and its handle 230 serve for controlling the motif frequency and, in the outermost left-hand position according to FIGS. 2 or 9, for lifting the arm 70 (FIG. 25) of the fork member 71 off the eccentric 69 (FIGS. 2 and 25). The lifting-off of the arm 70 is effected by a lug 83 of an angle piece 84, the lug engaging the fork arm 71 (FIG. 19). The angle piece 84 is joined to pin 76 by means of a screw 85 and possesses a longitudinal slot 86. A screw 87 cooperates with the slot 86 and is connected to arm 75. The screw-and-slot junction 86, 87 serves for equalizing manufacturing tolerances. This offers the possibility of placing the lug 83 accurately into contact with the fork arm 71.

The fork of arm 71 straddles a roller 88 journalled on a pivot pin 89 (FIG. 22) which is riveted into a plate 90 forming part of the coupling assembly 255 of FIG. 5. The plate 90 is fastened together with a coupling star 91 by means of screws, the star being rotatably mounted on the pivot of the flanged coupling plate 93. The coupling star 91 is held by a screw 94 screwed into the coupling part 93. The connection between the coupling part 93 and the coupling star 91 is effected through rollers 95, involving a conventional roller-type coupling. The coupling part 93 is rotatably mounted in a sleeve 97 by means of pin 96. The sleeve 97 has a shoulder 98 fastened by screws to carrier plate 16. In similarity to the coupling star 91, the shoulder 98 is also designed as a coupling star; and its rollers 99 also cooperate with the coupling part 93 like the coupling described in the foregoing. The parts 93, 98 and 99 operate as a clamping ratchet to prevent reverse rotation of the coupling part 93. Another pin 100 of the coupling part 93 carries a ring 101 which simultaneously rotates an entrainer keyway member 102 for entraining the cam discs 103, 104, 105 (FIGS. 5, 8, 9).

The nose 106 (FIG. 9) of feeler lever 107 cooperates with the cam discs 103 or 192, for the stitching-width control. The feeler lever 107 is connected with a sleeve 108 (FIG. 10) and is linked at 110 (FIG. 9) with a pull rod 109 whose other end is joined with the lever 17 at 111 (FIG. 9). A spring 112 biases the link 109 and is connected with an abutment pin 113 riveted into the plate 16.

The nose 114 of feeler lever 115 (FIGS. 3 and 9), employed for stitching-area control, cooperates with the cam disc 104 or cam disc 193. Lever 115 is joined to a pin 122. A link 116 is connected with the feeler lever 115 at 117. The other end of link 116 is pivotally connected at 118 to the lever 67 (FIG. 21). Link 116 is biased by a spring 119 (FIG. 9) which is attached at 120 (FIG. 8) by a holder pin riveted into the plate 16.

The nose 123 of feeler lever 124 (FIG. 3) cooperates with the cam disc 105 for stitching-length control. Feeler lever 124 is connected with a sleeve 125 (FIG. 10) and has a lug 126 acting upon a set screw 129 mounted in a lug 127 of lever 128. The lever 128 is connected with a sleeve 130. As is apparent from FIG. 10, the shaft 122 is received by the sleeves 108 and 130, whereas the sleeves 108 and 130 are journalled in a bushing 131 stationarily carried by plate 16. The sleeve 125 is mounted on an extension 132 of the bushing 131, the sleeve 125 being linked together with the lever 124, as already described. A fastening disc 133 connected with the shaft 122 holds the just-described journalling components together.

Figures 11, 12, 26:
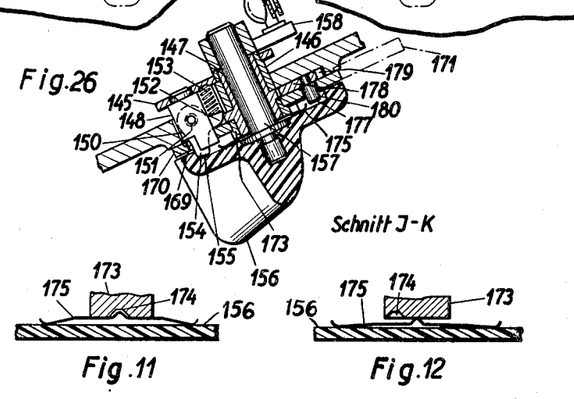
FIGS. 11 and 12 are detailed views of spring detent means for the material feeding control handle.
FIG. 26 is a sectional view of the stitching-length control means.
Figure 13:
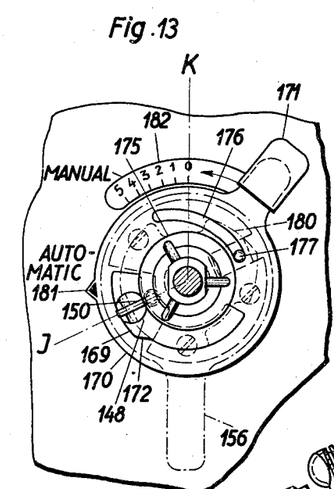
FIGS. 13 and 14 illustrate parts of the device controlling the operation of the material feeding control handle.
Figure 14:
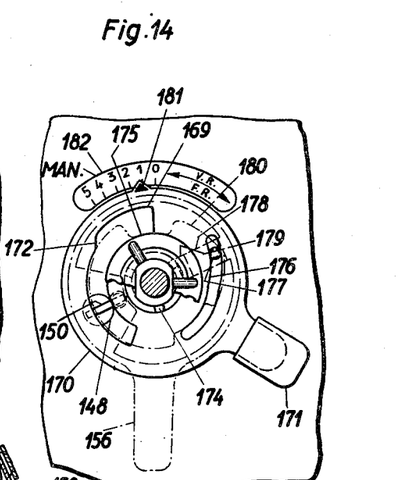

Lever 128 has a lateral lug 134 (FIGS. 8, 10) provided with a pin 135. The pin 135 is connected with a link 136 comprising a wire stirrup whose other end is linked to a pin 137 riveted into an angular lever 138. The angular lever 138 is rotatably mounted on a pivot pin 139 riveted into an angle element 140. The angle element 140 is firmly secured by screws to the above-described bearing block 51. The extension 141 of the angular lever 138 is connected at 142 with a link 143 whose other end is pivotally joined with an arm 145 at 144. The arm is biased by a spring 145a connected with the angle 140. The arm 145 has a sleeve 146 journalled on a sleeve 147 stationarily mounted in the housing 52. The arm 145 has an extension 148 which possesses a slot 149 (FIG. 8) for accommodating a pawl 150 (FIG. 26). Pawl 150 is rotatable at 151 and has an extension 152 biased by a pressure spring 153. The spring 153 is positioned against the arm 145. Another extension 154 of pawl 150 can cooperate with a groove 155 of a handle 156. The handle 156, consisting of plastic material, is firmly molded about the end of a shaft 157 which serves to control the feed motion, and is journalled within a sleeve 147.

Figure 15:
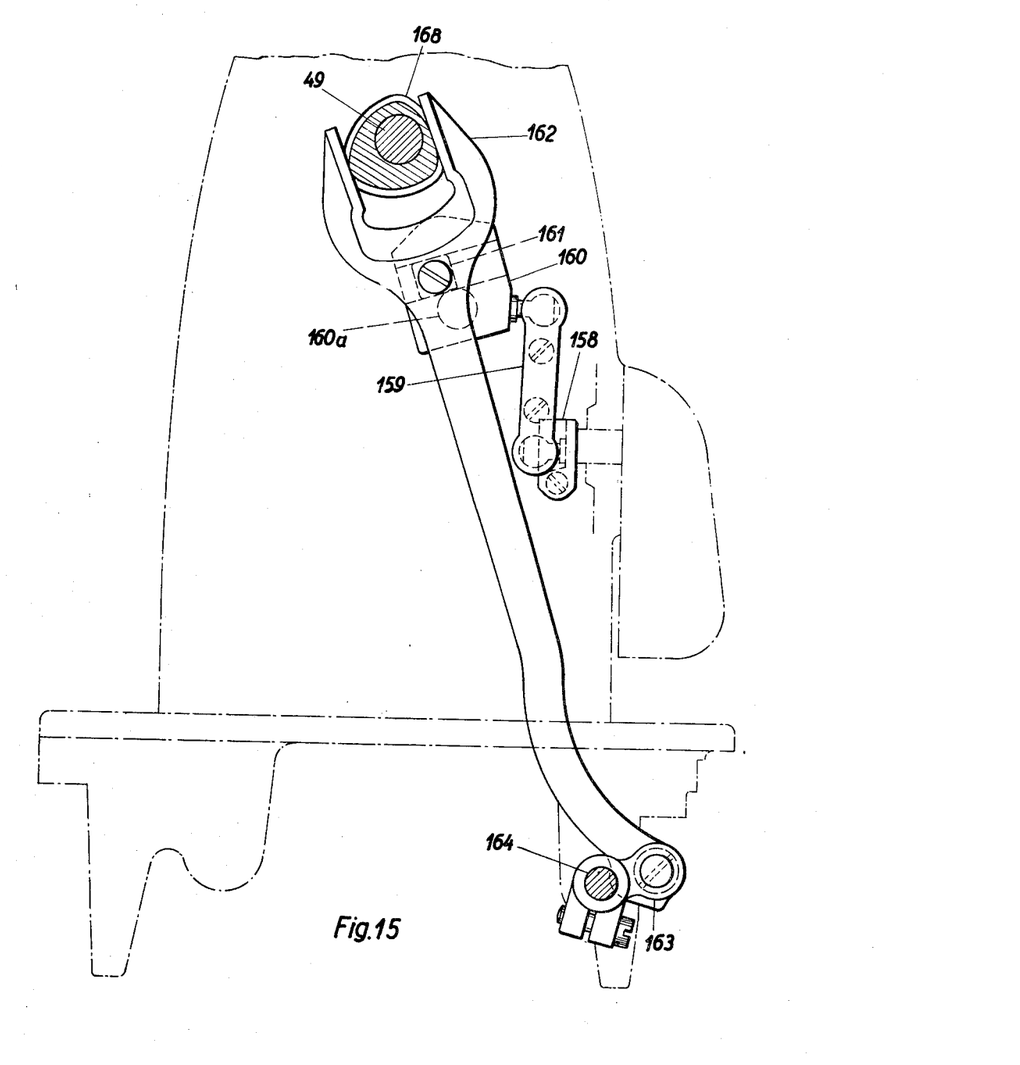
FIG. 15 is a front view of the material feeder fork.

A clamping shank 158 (FIG. 8) provides a connection through a link 159 with the feeder control slide-way block 160 (FIGS. 8 and 15). The feeder block 160, rotatably journalled on housing 52 by means of a pivot pin 160a, cooperates with a block 161 which is rotatably mounted on the feeder fork 162 and which slides in block 160. The feed-control fork 162 is connected to a crank 163 clamped fast upon a shaft 164. The known feeder crank 165 is mounted on the shaft 164 (FIG. 23) and acts upon a pusher carrier 166 for material pusher 167. The feed-control fork 162 is driven by an eccentric 168 mounted on the rotary shaft 49.

As already mentioned, the extension 154 (FIG. 26) of pawl 150 can cooperate at the proper time with a groove 155 of the handle 156 when the material pusher 167 is to be controlled automatically. The control of pawl 150 and thus of its extension 154 is effected by means of a recess 169 (FIGS. 13, 14) in a disc 170 appertaining to a setting means 171 which serves to determine the deflecting amplitude of the setting means 156, for control of the feed, and for coupling the automatic control of the feed. When adjusting the setting means 171 clockwise from the position "automatic" to "manual," the extension 154 of pawl 150 is moved counterclockwise by action of the inclination 172 and this end is thus removed out of the groove 155 of the handle 156. As soon as the inclination 172 runs onto the pawl, the automatic control of the material pusher, carried out by means of cam disc 105 and feeler lever 124, is eliminated.

The disc 170 is provided with a sleeve 173 which is journalled on the sleeve 147 (FIGS. 10, 26). Sleeve 173 has three grooves 174 on its outer end face (FIGS. 11 and 12). The grooves 174 act upon a spring 175 in such a manner that in the "manual" position of disc 170, that is, the setting means 171, the spring 175 is in the relative position illustrated in FIG. 12. In this position the spring 175 is actively pushing against and exerting a braking action upon the handle 156. This braking action is necessary in order to make the manual setting means self arresting. However, during automatic operation of the material pusher, the handle 156, which participates in the working motion, must operate with as little friction as possible. This is the case when the position of spring 175 is that shown in FIG. 11.

The setting disc 170 further possesses a cam way or slot 176 having an axially concentric and an ascending or outwardly curved portion. The cam way 176 acts upon a follower pin 177 fastened on a slide block 178. The block 178 is guided in a radial slot 179 of sleeve 147. The front end of pin 177 enters into a recess 180 in handle 156. Consequently, the pin 177 serves for limiting the displacing amplitude of the handle 156. When the stop pin 177 is in the outermost radial position, then the indicating pointer 181 registers with the number "0" of a scale 182. In this position, the handle 156 is arrested. However, when the pin 177 is in its innermost radial position, then the handle 156 can be turned over the total range of the indicating scale.

Figure 24:
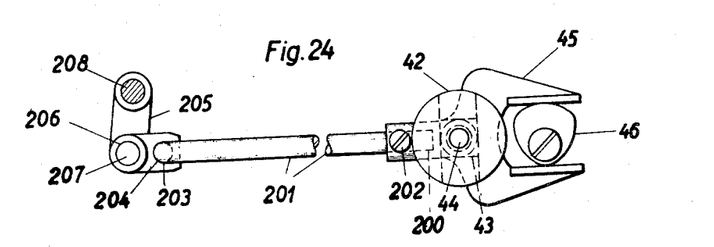
FIG. 24 is a view of the stitch control fork, from above.

It has been mentioned above that the stitch control fork 45 straddles the eccentric 46 adjoined with a bevel gear 47 (FIGS. 8, 10 and 24). The connecting rod 201 (FIG. 24) is fixed in the bore 200 of the stitch control fork 45 and projects, at its bent portion 203, into the bore 204 of the swinging frame 205. The swinging frame 205 has a bore 206 which accommodates the needle bar 207 and is mounted on the presser foot bar 208 so as to be rotatable but not longitudinally displaceable relative thereto.

The operation of the described device is as follows:

As already mentioned, the control member 1 serves for controlling the stitching width, whereas the control member 56 serves for controlling the stitching area as far as the setting of the stitching width or stitching area by hand are concerned.

However, the automatic control of the stitching area or the stitching width is effected by means of the cam discs 103, 104 which act upon the above-described devices through the feeler lever 107 or 115, and through the links 109 or 116. The coupling lever 24, which in the dot-and-dash position, in FIG. 9, permits control of the stitching width by hand and in the other position permits automatic control of the stitching width, acts through its arm 25 (FIGS. 8, 9) upon the pawl 20 to switch this pawl. As described, the pawl serves for the coupling of lever 12 with lever 17. The link 109 operates to transfer the embroidery pattern, defined by the cam disc 103, onto the oscillating needle bar 207 and thus onto the sewing material.

The automatic control of the stitching area is effected by placing the handle 59 on arm 56 into the position shown in FIG. 21, thus coupling the lever 67 through the pin 65 with the arm 56. Since the link 116 is pivotally connected with the lever 67 and, as already described, is controlled by the cam disc 104, there now occurs an automatic displacement of the slider 33 and thus a control action upon the block 42 (FIG. 8) for the purpose of displacing the needle bar 207 in accordance with the adjusted stitching area.

As already described, the control means 156 serves for controlling the feed, as far as manual driving of the material pusher 167 is concerned.

The automatic control of the material feed is carried out by the cam disc 105 (FIGS. 5 and 9) acting upon the arm 145 through the medium of the feeler lever 124 and through the adjusting set screw 129 (FIG. 10), the lever 128, the wire link 136, the angular lever 138, and the link 143. When the manual adjusting means 171 is in the position "automatic" (see particularly FIGS. 26 and 13), then the pawl 150 is placed into engagement with the handle 156. Consequently, when the arm 145 is being driven, the manual setting means 156 is also driven so that its shaft 157 automatically controls the feeder slideway member 160 (FIG. 15) through the clamping crank 158 and through the link 159. During rotation of the arm shaft 49, the eccentric 149 imparts lateral deflections to the feeder fork 162. Depending upon the position of the block 160, the feeder fork 162 then deflects in its longitudinal direction or in opposition thereto as determined by its guidance by the block 161 in slide-way 160. The lifting motion, constrainedly following therefrom, is transmitted by the crank 163 and the shaft 164 onto the feeder crank 165 (FIG. 23) which acts upon the material pusher 167 through the pusher carrier 166.

As stated above, the automatic control of the motif frequency is effected by means of the cam disc 220 (FIG. 2) cooperating with the nose 221 of the feeler lever 222. The feeler lever 222 acts through the link 223 upon the lever 226. As noted above, lever 226 is coupled with the arm 77 by means of pin 228 of pusher part 229. As a result, the control movements of cam disc 220 are transmitted to arm 77 for automatic control of the motif frequency.

It is understood that for manual setting of the handle 230 and hence of the arm 77 according to FIGS. 6 and 18, the pin 228 is placed out of engagement with the fork-shaped recess of lever 226 by displacing the handle 230. This uncouples the automatic drive.

We claim:

1. In a zigzag sewing machine, the combination of a material feed device, an axially reciprocable needle bar laterally oscillatable for producing lateral stitches, automatic control apparatus having rotary cam means and operably linked to said material feed device and to said needle bar to control the rate of feeding of the material being sewed on and thereby the stitching length, and to move the needle bar laterally to control the stitching area and stitching width of said lateral stitches, drive means arranged to reciprocate said needle bar and to turn said rotary cam means, and a motif frequency control device having a rotary cam element drivable by said drive means and operably linked to said needle bar for automatically varying the number of axial reciprocating stitch movements of said needle bar occurring per rotation of said cam means.

2. In a zigzag sewing machine, the combination of a material feed device, an axially reciprocable needle bar laterally oscillatable for producing lateral stitches, automatic control apparatus having rotary cam means and operably linked to said material feed device and to said needle bar to control the rate of feeding of the material being sewed on and thereby the stitching length, and to move the needle bar laterally to control the stitching area and stitching width of said lateral stitches, drive means arranged to reciprocate said needle bar and to turn said rotary cam means, and a motif frequency control device having a rotary cam element drivable by said drive means and operably linked to said needle bar for automatically varying the number of axial reciprocating stitch movements of said needle bar occurring per rotation of said cam means, said motif frequency control device including transmission means of adjustable transmission ratio connected to said drive means for varying the ratio of speed of said rotary cam means and said cam element in relation to the reciprocating movements of said needle bar.

3. In a zigzag sewing machine, the combination of a main shaft having gear means fixedly attached thereto, an axially reciprocable needle bar laterally oscillatable for producing lateral stitches, a motion translating apparatus intermediate said needle bar and said gear means for translating motion of said main shaft into oscillatory motion of said needle bar, a first mechanism engageable with said motion translating apparatus for controlling the amplitude of said oscillatory motion transmitted to said needle bar so as to control the stitching width performance of said needle bar, a second mechanism operably engageable with said motion translating apparatus for displacing the location of said oscillatory motion in said motion translating apparatus so as to control the stitching area performance of said needle bar, a control device comprising selectively exchangeable rotary cam means and cam follower means cooperative with said cam means and linked to at least one of said mechanisms for automatically controlling motion of said mechanism in accordance with the shape of said cam means, a transmission of adjustable transmission ratio operably connected between said control device and said gear means for rotating said cam means and automatic motif-frequency control means comprising a rotary cam element mounted for rotation on a common axis together with said cam means, said cam element being provided with a corresponding cam follower cooperative therewith and with linking means operably connecting said last-named follower with said transmission for varying said transmission ratio to thereby control the number of axial reciprocating stitch movements of said needle bar occurring per rotation of said cam means.

4. A zigzag sewing machine, comprising a housing, a main shaft horizontally disposed in said housing and having gear means, mounted thereon, an axially and vertically reciprocable needle bar laterally oscillatable for producing lateral stitches, motion-translating means having a gear member engageable with said gear means to be driven from said shaft, said translating means having an oscillatory member in driving connection with said needle bar for imparting horizontal oscillations thereto, a first mechanism for controlling the amplitude of said oscillations, and a second mechanism for displacing the location of said oscillations so as to control the stitching width and stitching area respectively, said two mechanisms each being operably connected with said translating means, a material feed device, a third mechanism operably connected between said main shaft and said material feed device to control the rate of feeding the material to be sewed upon, a control device comprising selectively exchangeable rotary cam means and cam follower means cooperative with said cam means and linked to each of said mechanisms for automatically controlling said mechanisms, a transmission of adjustable transmission ratio operably connected between said control device and said gear means for rotating said cam means, and automatic motif-frequency control means comprising a rotary cam mounted for rotation on a common axis together with said cam means, said rotary cam being provided with a cam follower cooperative therewith and with linking means operably connecting said last-named follower with said transmission for varying said ratio.

5. A zigzag sewing machine having a material feed device, a lengthwise reciprocable needle bar laterally oscillatable for producing lateral stitches, automatically actuated control means operably linked to said material feed device for controlling the rate of feeding of the material being sewed on and also being operably linked to said needle bar to laterally move said needle bar so as to control the stitching area and stitching width respectively, drive means arranged for reciprocating said needle bar, and energizing means engageable with said drive means for actuating said automatically actuated control means, apparatus for automatically controlling the motif frequency, said apparatus including a rotary cam element having a corresponding cam follower operatively connected to said energizing means so as to vary the relative speed of said automatically actuated control means with respect to the speed of reciprocation of said needle bar by said drive means, a manual control structure operatively engageable with said energizing means for manually changing the motif frequency, and coupling means on said manual control structure for selectively connecting and disconnecting said apparatus for automatically controlling the motif frequency to and from said manual control structure.

6. A zigzag sewing machine having a material feed device, a lengthwise reciprocable needle bar laterally oscillatable for producing lateral stitches, rotary cam means, automatic control apparatus actuated by said rotary cam means and operably linked to said material feed device for controlling the rate of feeding of the material being sewed on and also being operably linked to said needle bar to laterally move said needle bar so as to control the stitching area and stitching width respectively, drive means arranged for reciprocating said needle bar, a device for automatically controlling the motif frequency including a rotary cam element connected for rotation by said drive means and a cam follower cooperating with said cam element, variable transmission means operably engageable with said drive means and arranged to turn said rotary cam means and cam element simultaneously in variable speed correlation with the reciprocating movements of said needle bar, said automatic motif-frequency controlling device including control linkage elements operatively connected to said cam follower for variably setting the speed ratio of said variable transmission means for changing the speed of rotation of said rotary cam means with respect to the reciprocations of said needle bar, a manual control structure for selectively manually controlling the motif frequency disengageably connected to said control linkage elements of said device for automatically controlling motif frequency so as to be movable thereby when connected thereto.

7. The apparatus defined in claim 6, and means on said manual control structure for engaging and disengaging it from the device for automatically controlling the motif frequency.

8. A zigzag sewing machine having a material feed device, a lengthwise reciprocable needle bar laterally oscillatable for producing lateral stitches, automatically actuated control means operably linked to said material feed device for controlling the rate of feeding of the material being sewed on and also being operably linked to said needle bar to laterally move said needle bar so as to control the stitching area and stitching width respectively, drive means arranged for reciprocating said needle bar, and energizing means engageable with said drive means for actuating said automatically actuated control means, apparatus for automatically controlling the motif frequency, said apparatus including a rotary cam element having a corresponding cam follower operatively connected to said energizing means so as to vary the relative speed of said automatically actuated control means with respect to the speed of reciprocation of said needle bar by said drive means, and a manual control structure, pivotally mounted and operatively engageable with said energizing means for manually changing the motif frequency, slider means slidably mounted on said structure for disengaging and engaging, at will, said apparatus for automatically controlling the motif frequency from said manual control structure, said slider means carrying resilient detent means thereon, and a stationary bridge transversely positioned across said manual control structure under which said detent means is drawn when said slider means is pulled out to its disengaging position, said bridge thereupon providing a braking surface to resist movement of said slider means and thus of said manual control structure.

9. A zigzag sewing machine having a material feed device, a lengthwise reciprocable needle bar laterally oscillatable for producing lateral stitches, automatically actuated control means operably linked to said material feed device for controlling the rate of feeding of the material being sewed on and also being operably linked to said needle bar to laterally move said needle bar so as to control the stitching area and stitching width respectively, drive means arranged for reciprocating said needle bar, and energizing means engageable with said drive means for actuating said automatically actuated control means, apparatus for automatically controlling the motif frequency, said apparatus including a rotary cam element having a corresponding cam follower operatively connected to said energizing means so as to vary the relative speed of said automatically actuated control means with respect to the speed of reciprocation of said needle bar by said drive means, a manual control structure operatively engageable with said energizing means for manually changing the motif frequency, and coupling means on said manual structure to connect and disconnect, at will, the means for energizing said automatic control means for stitching area, stitching width, and rate of feeding the material.

10. In a zigzag sewing machine, the combination of a material feed device, an axially reciprocable needle bar laterally oscillatable for producing lateral stitches, automatic control apparatus having rotary cam means and operably linked to said material feed device and to said needle bar to control the rate of feeding of the material being sewed on and thereby the stitching length, and to move the needle bar laterally to control the stitching area and stitching width of said lateral stitches, drive means arranged to reciprocate said needle bar and to turn said rotary cam means, transmission means of variable speed ratio operably and disengageably connected to said drive means to turn said rotary cam means in variable speed correlation with the reciprocating movements of said needle bar, a selectably exchangeable cam element rotatably arranged to be turned by said transmission means, manual setting means operably connected to said transmission means for selectively setting the ratio thereof, said manual setting means being also operable, in one predetermined position thereof, to disengage said transmission means from said drive means, said selectably exchangeable cam element having a cam surface and cam follower means cooperative therewith operatively linked to said manual setting means to move said manual setting means to said predetermined position to disengage said transmission.

11. A sewing machine capable of straight-line and zigzag sewing and capable of adjustment to make button-holes automatically, said machine having a material feed device, an axially reciprocable needle bar, first and second automatic means comprising respective first and second cams operably linked to said needle bar to move said needle bar laterally as desired to control the stitching width and stitching area movements of said needle bar, respectively, third automatic means comprising a third cam operably linked to said material feed device for controlling the rate of feeding of the material being sewed on to thereby control the stitching length, a fourth automatic means comprising a fourth cam, knob setting means disengageably assembling all four said cams into a rigid unit for coaxial rotation to thereby actuate all of said automatic means to coact to produce a sequence of operations in said needle bar and said material feed device for automatic sewing of a button-hole, motor driven variable speed ratio transmission means disengageably and operably connected to said four cams for turning all four said cams incrementally in one direction only, said knob setting means having indicator symbols marked thereon for designating the rotary position of said four cams, each symbol corresponding to one operation in said sequence of operations for sewing of a button-hole, said fourth automatic means being operably linked from said fourth cam to said transmission means so as to be settable, by means of said knob setting means, to disengage said transmission means from turning said four cams.

12. A zigzag sewing machine having a housing and a cover plate therefor movable to an open and closed position, a material feed device, a lengthwise reciprocable needle bar laterally oscillatable for producing lateral stitches, automatic control apparatus having rotary cams and corresponding cam follower levers respectively operably linked to said material feed device and to said needle bar to control the rate of feeding of the material being sewed on and thereby the stitching length, and to move the needle bar laterally to control the stitching area and stitching width of said lateral stitches, drive means arranged to reciprocate said needle bar, means including a speed ratio controlling transmission engageable with said drive means for turning said cams, automatic governing means including an additional rotary cam having a respective cam follower lever operably linked to said transmission to govern same, all of said rotary cams being mounted for rotation together about a common axis, each of said cam follower levers being pivotally mounted, a common releasing lever operatively positioned to simultaneously pivot all of said cam follower levers away from their respective cams, and means carried by said cover plate and engageable with said releasing lever for pivoting all of said cam follower levers away from said cams for access to exchange said cams.

13. The sewing machine as described in claim 12, the means carried by the cover plate comprising a member which also serves to support the cover in open position.

14. A zigzag sewing machine having a material feed device, a lengthwise reciprocable needle bar laterally oscillatable for producing lateral stitches, automatically actuated control means having two individual selectable rotary cams and operably linked to laterally move said needle bar so as to control the stitching area and stitching width respectively, automatically actuated control means including a third rotary cam operably linked to said material feed device for controlling the rate of feeding of the material being sewed on, drive means arranged for reciprocating said needle bar, means including a speed ratio controlling transmission engageable with said drive means for turning said cams, automatic governing means including a fourth rotary cam operably linked to said transmission to govern same, said four cams being mounted for rotation together about a common axis.

15. A zigzag sewing machine having a material feed device, a lengthwise reciprocable needle bar laterally oscillatable for producing lateral stitches, automatically actuated control means having two individual selectable rotary cams and operably linked to laterally move said needle bar so as to control the stitching area and stitching width respectively, automatically actuated control means including a third rotary cam operably linked to said material feed device for controlling the rate of feeding of the material being sewed on, drive means arranged for reciprocating said needle bar, means including a speed ratio controlling transmission engageable with said drive means for turning said cams, automatic governing means including a fourth rotary cam operably linked to said transmission to govern same, said four cams being mounted for rotation together about a common axis, said means for turning said cams including a rotating driving cam connected to said drive means for being rotated thereby, said transmission comprising a lever having a pivot and being engageable by said driving cam to oscillate about said pivot during rotation of said driving cam, a uni-directional-motion mechanism operatively connected with said four cams for driving same and engageable by said lever to translate oscillations of said lever into progressive incremental rotation of said four cams, said pivot being displaceable relative to its spacing from said driving cam so as to vary the leverage of said lever between said driving cam and said mechanism, said automatic governing means further including pivot control means connected with said pivot for so displacing it.

16. A zigzag sewing machine having a material feed device, a lengthwise reciprocable needle bar laterally oscillatable for producing lateral stitches, automatically actuated control means having two individual selectable rotary cams and operably linked to laterally move said needle bar so as to control the stitching area and stitching width respectively, automatically actuated control means including a third rotary cam operably linked to said material feed device for controlling the rate of feeding of the material being sewed on, drive means arranged for reciprocating said needle bar, means including a speed ratio controlling transmission engageable with said drive means for turning said cams, automatic governing means including a fourth rotary cam operably linked to said transmission to govern same, said four cams being mounted for rotation together about a common axis, and a manual control device to govern the ratio of said transmission, and coupling means carried by said manual control device and operable to selectively connect and disconnect the automatic governing means from said transmission.

17. The apparatus described in claim 15, and including a manual control device to govern the ratio of said transmission, and coupling means carried by said manual control device and operable to selectively connect and disconnect the automatic governing means from said transmission.

References Cited in the file of this patent

UNITED STATES PATENTS

| | | |
|---|---|---|
| 592,510 | Parkes | Oct. 26, 1897 |
| 652,327 | Parkes | June 26, 1900 |
| 935,847 | Hogan | Oct. 5, 1909 |
| 2,202,515 | Bolter et al. | May 28, 1940 |
| 2,653,557 | Casas-Robert et al. | Sept. 29, 1953 |
| 2,854,935 | Benink et al. | Oct. 7, 1958 |
| 2,905,119 | Bono | Sept. 22, 1959 |

FOREIGN PATENTS

| | | |
|---|---|---|
| 904,020 | Germany | Feb. 15, 1954 |